United States Patent [19]

Check et al.

[11] 4,191,878
[45] Mar. 4, 1980

[54] ELECTRODE POSITIONING GAGE FOR MULTIPLE ELECTRODE ELECTRICAL DISCHARGE MACHINING APPARATUS

[75] Inventors: John M. Check, Chelsea; Gary F. Rupert, Ann Arbor, both of Mich.

[73] Assignee: Raycon Corporation, Ann Arbor, Mich.

[21] Appl. No.: 825,970

[22] Filed: Aug. 19, 1977

Related U.S. Application Data

[63] Continuation-in-part of Ser. No. 662,025, Feb. 27, 1976, Pat. No. 4,044,216.

[51] Int. Cl.² ............................................. B23P 1/12
[52] U.S. Cl. ................................ 219/69 E; 219/69 G
[58] Field of Search ............... 219/69 E, 69 M, 69 G, 219/69 V, 69 R, 69 C, 131 F; 204/224 M, 129.55; 279/102; 408/18; 51/98 SP, 105 SP, 165.93

[56] References Cited

U.S. PATENT DOCUMENTS

| 3,601,572 | 8/1971 | Check et al. | 219/69 E |
| 3,729,609 | 4/1973 | Check et al. | 219/69 G |
| 4,041,269 | 8/1977 | Baker | 219/69 E |

FOREIGN PATENT DOCUMENTS 1269609  4/1972  United Kingdom ................. 219/69 E Primary Examiner—Bruce A. Reynolds
Assistant Examiner—Clifford C. Shaw
Attorney, Agent, or Firm—Olsen and Stephenson

[57] ABSTRACT

Electrical discharge machining apparatus in which a plurality of generally parallel electrodes are moved during machining and during refeed in generally parallel paths. A drive roller assembly is provided for refeeding the electrodes after each machining cycle to compensate for erosion of the electrodes that occurred during the preceding machining cycle. The drive roller assembly consists of a plurality of rollers arranged on opposite sides of the electrodes so that the electrodes are drivingly engaged between the rollers. The apparatus is further equipped with a movable gage member having an electrode engaging surface. After each machining cycle, the gage member is moved to a predetermined position between the location of the workpiece and the electrodes. The electrodes are refed into engagement with the electrode engaging surface which defines a reference surface between the workpiece and the electrodes. Refeed of the electrodes is terminated when the electrodes engage the gage member. After refeed is completed, the gage member is retracted and the machining cycle is initiated.

2 Claims, 13 Drawing Figures

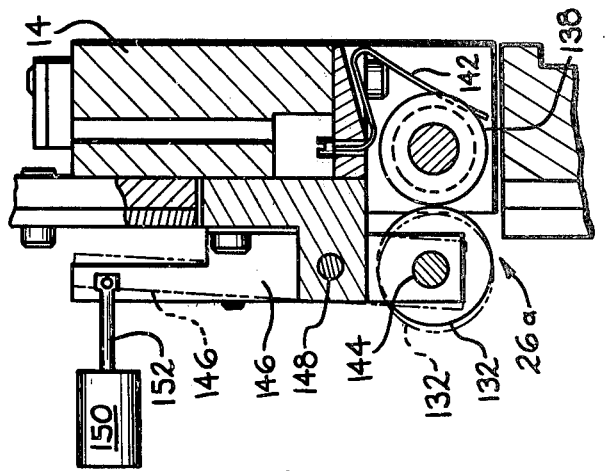
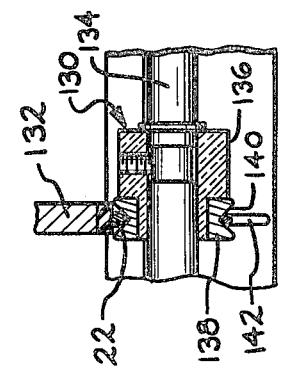
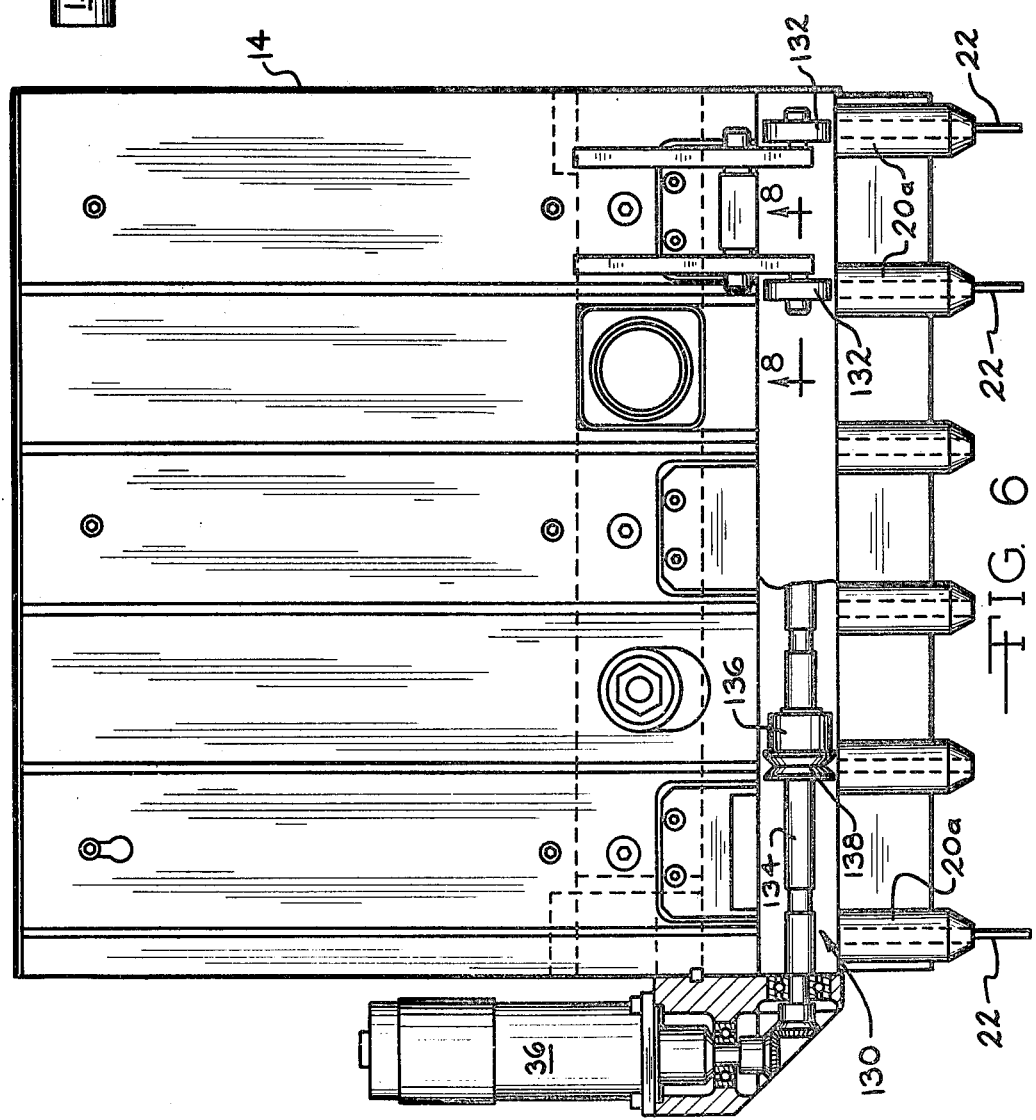

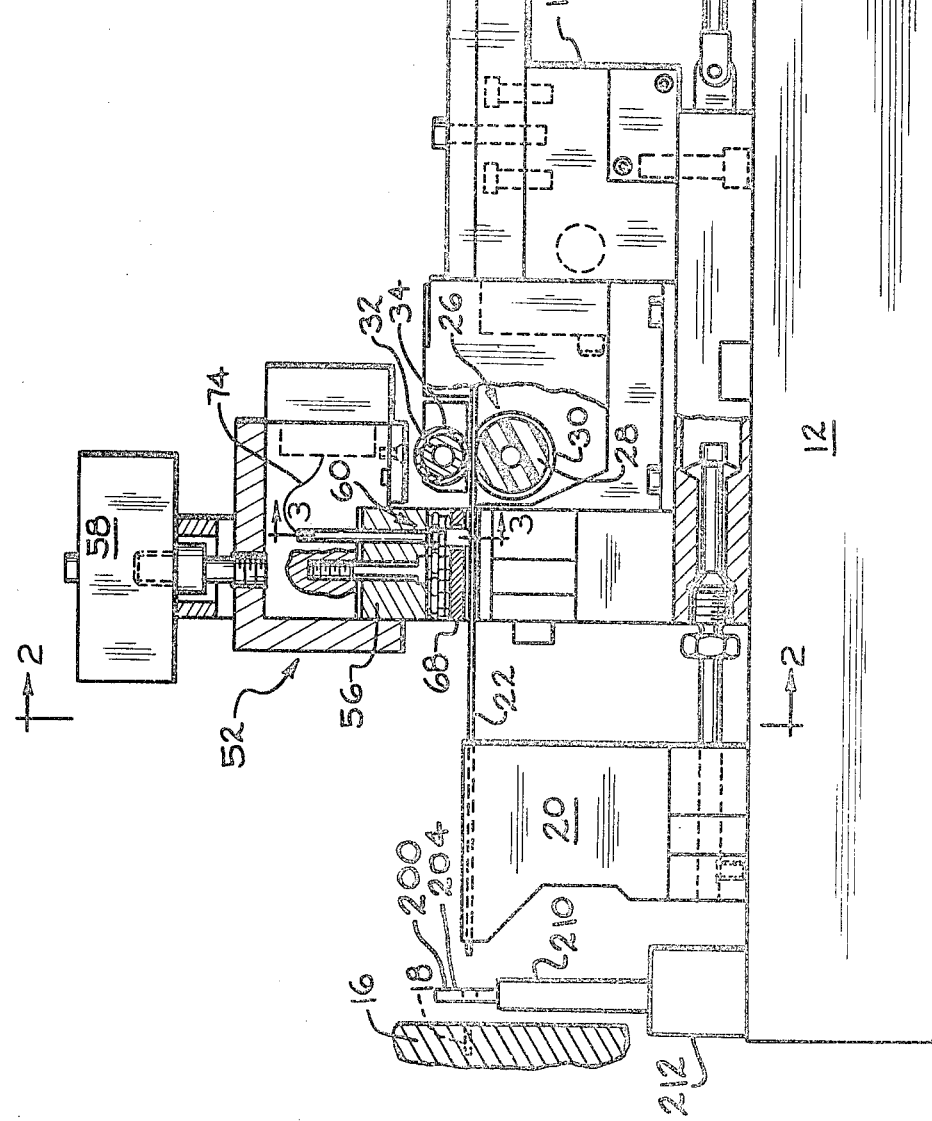

ELECTRODE POSITIONING GAGE FOR MULTIPLE ELECTRODE ELECTRICAL DISCHARGE MACHINING APPARATUS

REFERENCE TO RELATED APPLICATION

This application is a continuation-in-part of co-pending application Ser. No. 662,025, filed Feb. 27, 1976, now U.S. Pat. No. 4,044,216 and assigned to the assignee of the present application.

BACKGROUND OF THE INVENTION

U.S. Pat. No. 3,729,609, assigned to the assignee of this application, discloses electrical discharge machining apparatus in which a plurality of substantially parallel wire electrodes are used to concurrently machine a plurality of small holes in a workpiece. The patent discloses apparatus in which the electrodes are manually refed following each machining cycle to compensate for electrode erosion that took place during the preceding cycle. U.S. Pat. No. 3,601,572, also assigned to the assignee of this application, discloses apparatus whereby a hole larger than the diameter of the electrode can be formed using the EDM process. A gage block is shown for positioning a single electrode, which is angularly oriented relative to the axis of the hole that is to be machined, at a position spaced from the axis of the hole. It is an object of the present invention to provide improved electrical discharge machining apparatus of multiple electrode type in which a gage member is utilized in cooperation with the refeed system to refeed the electrodes after machining to a fixed position adjacent the workpiece that is to be machined.

SUMMARY OF THE INVENTION

The electrical discharge machining apparatus of this invention consists of a main frame or platen on which a carriage or slide is mounted for movement back and forth toward and away from the work to be machined. A plurality of generally parallel electrodes are mounted on the carriage for movement therewith to machine holes in the work. An electrode guide member is mounted in a fixed position on the frame adjacent to the work for guiding the electrodes into engagement with a gage member that is moved to a location adjacent the work after each machining cycle. The gage member has an electrode engaging surface which serves to define a reference surface when the gage member is moved to its location adjacent the work. After a machining cycle is completed, the electrodes are retracted and the gage member is moved into position so that the electrodes can be refed to the reference surface. A drive roller assembly mounted on the carriage is operable to drive the electrodes into engagement with the gage member following each machining cycle to compensate for electrode erosion which occurred during the preceding cycle. A clamp mechanism is mounted on the carriage between the refeed rollers and the electrode guide member for clamping the electrodes in fixed positions on the carriage during the machining cycle so as to preclude any undesirable movement between the electrodes and the carriage during the machining cycle.

In one embodiment of the invention, the gage member has a plurality of through openings formed in the electrode engaging surface. During machining, the gage member is moved to a position enabling the electrodes to project through the openings. After machining, the electrodes are retracted and the gage member is moved generally transversely with respect to the path of movement of the electrodes to a position such that upon refeed, the electrodes will engage the reference surface of the gage member. Use of the gage member with the openings reduces the distance through which the gage member must be moved after each machining cycle.

Further objects, features and advantages of this invention will become apparent from a consideration of the following description, the appended claims, and the accompanying drawing in which:

FIG. 6 is a top view of a portion of another embodiment of the apparatus of this invention, with some parts removed for the purpose of clarity;

FIG. 7 is a fragmentary side view of a portion of the apparatus shown in FIG. 6;

FIG. 8 is a fragmentary sectional view of a portion of the apparatus shown in FIG. 6 as seen from substantially the line 8—8 in FIG. 6;

FIG. 10 is a side elevational view of a modified form of the apparatus illustrated in FIG. 1.

FIG. 11 is a front elevational view of a gage member used for positioning the electrodes; and FIG. 12 is a front elevational view of a modified form of the gage member illustrated in FIG. 11.

Figure 1:
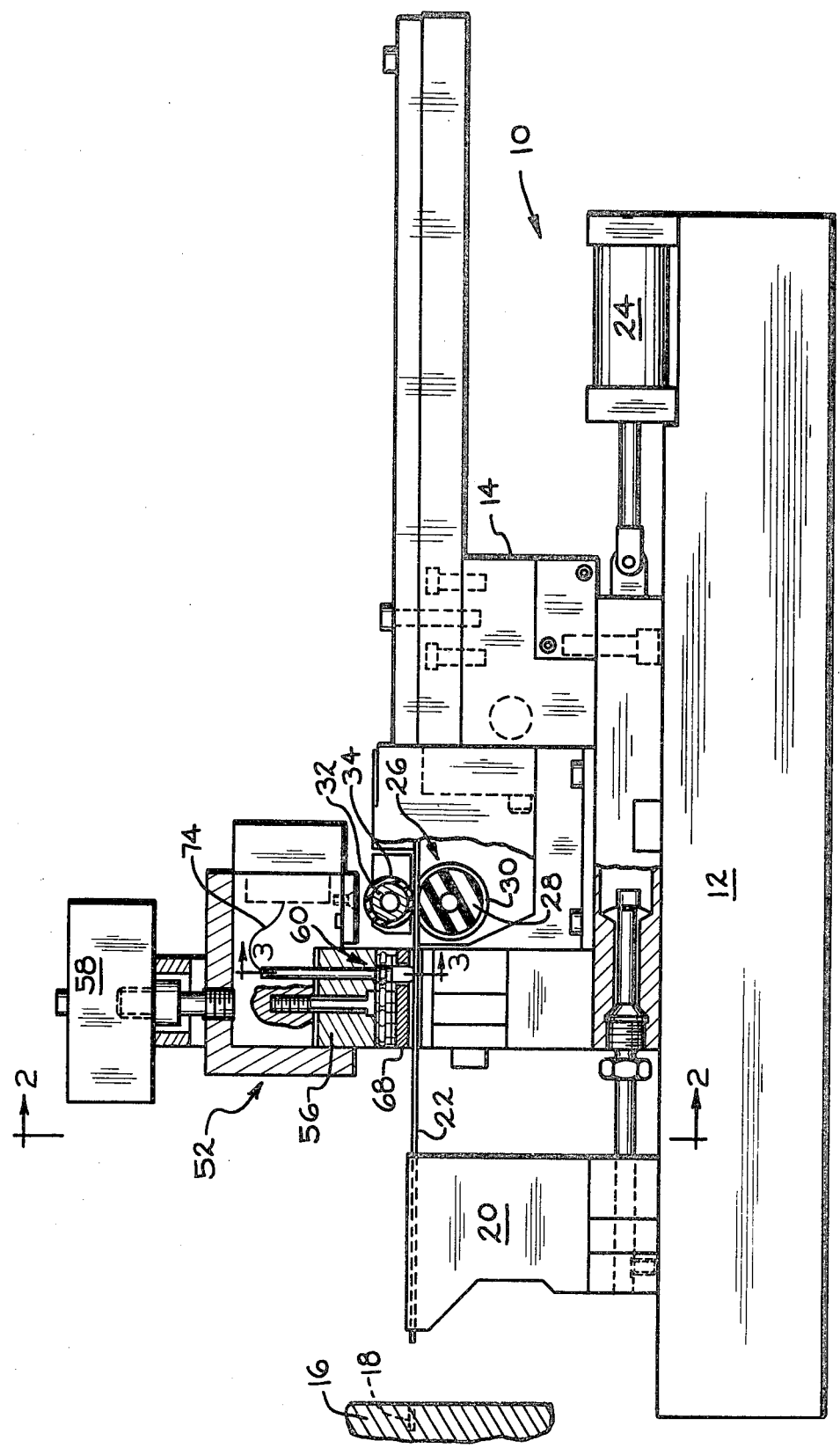
FIG. 1 is a side elevational view of the apparatus of this invention, with some parts broken away and other parts shown in section for the purpose of clarity.

With reference to the drawing, the electrical discharge machining apparatus of this invention, indicated generally at 10, is shown in FIG. 1 as including a main frame or platen 12 on which a carriage or slide 14 is slidably mounted for movement toward and away from a workpiece 16 for the purpose of forming a plurality of openings 18 therein by the EDM process. An electrode guide member 20 is mounted in a fixed position on the frame 12 for guiding a plurality of substantially parallel horizontally spaced electrodes 22 into engagement with the work 16 so as to form the holes 18 therein. As used herein, the term "substantially parallel electrodes" is inclusive of electrodes that are generally parallel over a portion of their lengths only, it being understood that it is sometimes desirable to form the holes 18 so that they are not parallel with respect to each other, and it is sometimes desirable for mechanical reasons to fan out the electrodes 22.

A motor assembly 24 on the frame 12 is connected to the carriage 14 for moving the carriage 14 toward the electrode guide member 20, and thus the work 16, during a hole forming machinery cycle and for retracting the carriage 14 relative to the work 16 following each cycle.

The apparatus 10 of this invention is particularly useful in forming small holes 18 with the wire electrodes 22. One of the known phenomenon that takes place during electrical discharge machining with wire electrodes 22, is the erosion of the electrodes during the machining cycle. The erosion is not uniform and must be compensated for prior to the next machining cycle. The step of replenishing the eroded portions of the electrodes 22 is referred to herein as "refeed".

Figure 4:
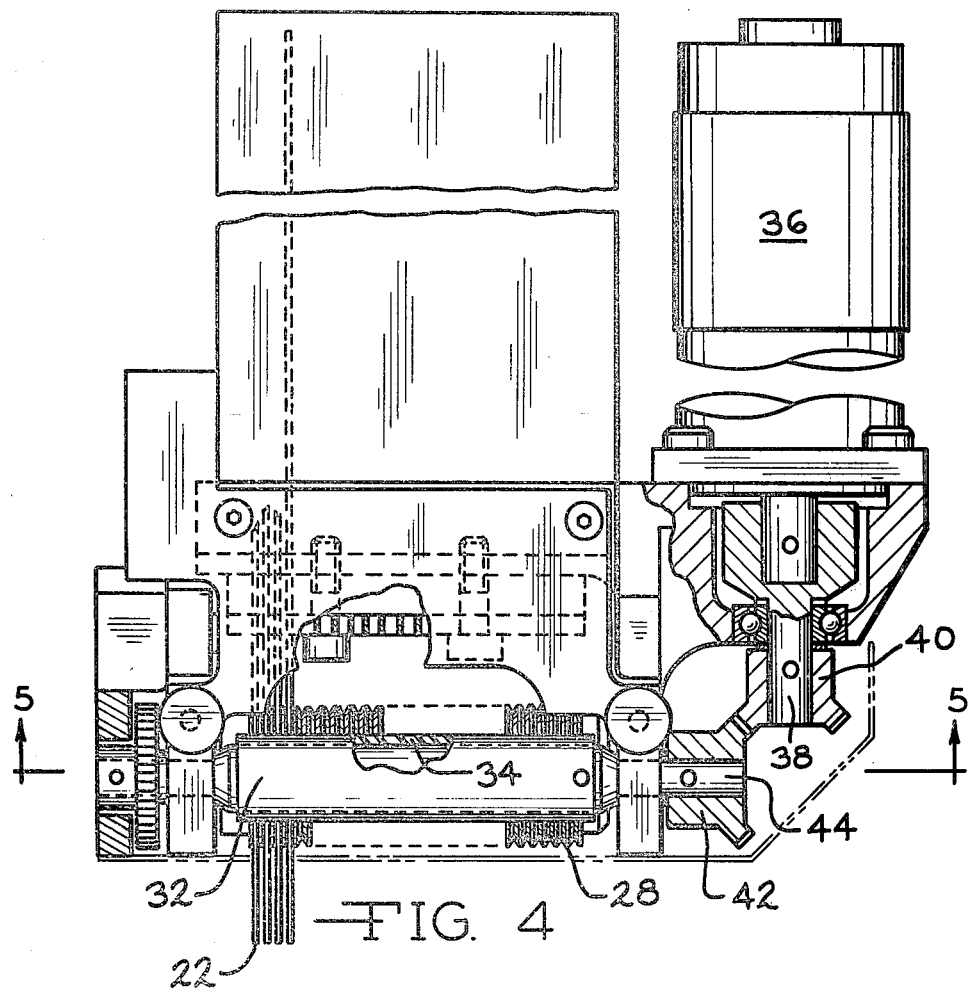
FIG. 4 is a top view of the drive roller assembly in the apparatus of this invention with some parts broken away and other parts shown in section for the purpose of clarity.
Figure 5:
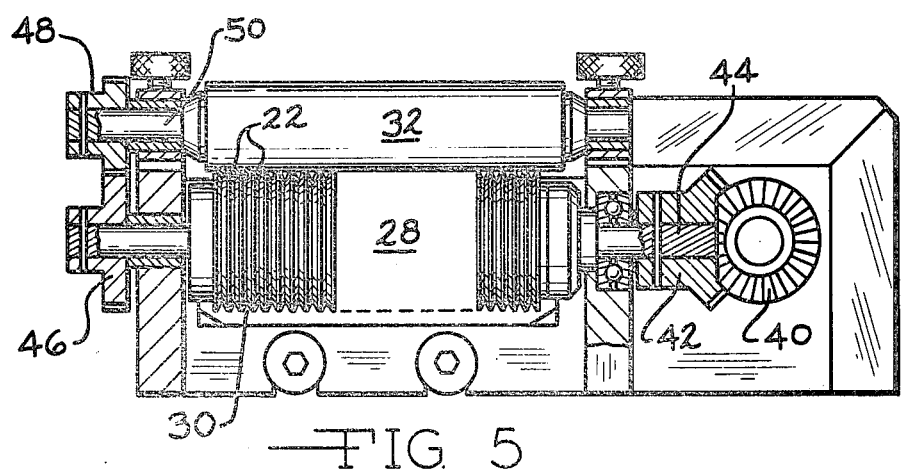
FIG. 5 is a transverse sectional view of the drive roller assembly in the apparatus of this invention, as seen from substantially the line 5—5 in FIG. 4.

In the apparatus 10, an electrode drive roller assembly 26 is provided for driving the electrodes 22 into engagement with the work 16 following each machining cycle. This refeed of the electrodes 22 places the electrodes in positions in which they can be located to commence the next machining cycle, namely, in spark producing positions spaced slightly rearwardly from the work 16. As shown in FIGS. 1, 4 and 5, the drive roller assembly 26 consists of a lower roller 28 provided with a plurality of parallel circumferential grooves 30 and an upper roller 32 provided with a surface layer 34 of yieldable material having a high coefficient of friction, such as rubber. The layer 34 is electrically nonconductive and the material from which the roller 28 is made is likewise of a non-conductive material.

As shown in FIG. 4, a carriage mounted drive motor 36 has an output shaft 38 on which a gear 40 is mounted and positioned in meshing engagement with a second gear 42 secured to the drive shaft 44 for the roller 28. The drive shaft 44 carries a second gear 46 which meshes with a gear 48 on the shaft 50 for the upper roller 32. Thus, in response to operation of the motor 36, the rollers 28 and 32 are rotated in directions to move the electrodes 22 toward the work 16. More particularly, the roller 28 rotates in a counterclockwise direction as viewed in FIG. 1 and the roller 32 rotates in a clockwise direction. Each groove 30 is of a depth less than the diameters of the electrodes 22 so that the electrodes are firmly gripped between the rollers 28 and 32 as shown in FIG. 5. The yieldable outer layer 34 on the roller 32 facilitates the application of frictional driving forces to the electrodes 22.

An electrode clamping assembly 52 is mounted on the main frame 12 at a position between the drive roller assembly 26 and the wire guide member 20. The purpose of the electrode clamping assembly 52 is to enable clamping of the electrodes 22 onto the carriage 14 following refeed of the electrodes 22 to preclude any slipping of the electrodes relative to the carriage during the machining cycle.

Figure 2:
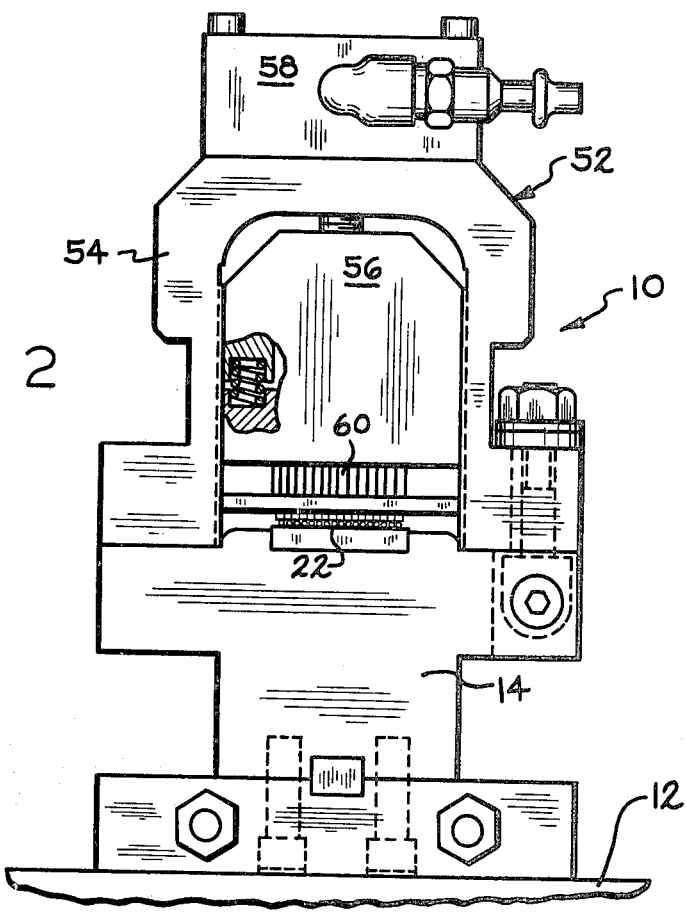
FIG. 2 is a transverse sectional view of the apparatus of this invention as seen substantially from the line 2—2 in FIG. 1, with some parts broken away and other parts shown in section for the purpose of clarity.
Figure 3:
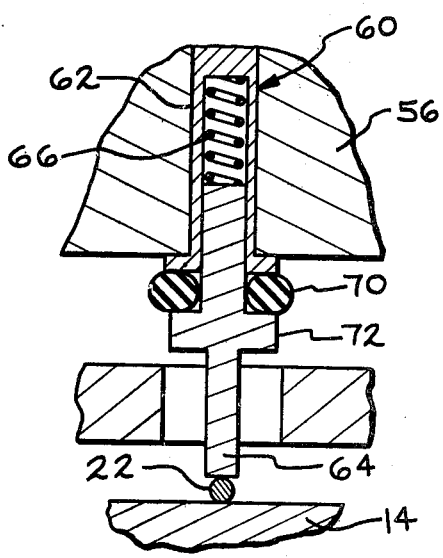
FIGS. 3 and 3A illustrate the electrode clamping unit in the apparatus of this invention, showing the unit in two relatively moved positions.

As shown in FIG. 2, the clamping assembly 52 comprises an inverted U-shape guide structure 54 mounted on and extended upwardly from the carriage 14. A head member 56 is guidably supported on the guide structure 54 and is connected to a motor assembly 58 on the guide structure 54 capable of moving the head member 56 up and down relative to the carriage 14. A plurality of electrode clamping units 60, only one of which is shown in FIG. 1, are mounted in the head member 56 and correspond in number to the number of electrodes 22. Each clamping unit 60 (FIGS. 3 and 3A) has a tubular part 62 mounted in the head member 56 so that it has a lower open end. A plunger part 64 is telescoped into the tubular part 62 into engagement with a compression spring 66 confined therein. The spring 66 urges the part 64 toward the electrode 22 which is supported on the top side of the carriage 14 in vertical alignment with the part 64. As shown in FIGS. 1 and 2, the tubular part 64 in each unit 60 is guidably supported in a guide plate 68 disposed below the head member 56 and fixed on the structure 54.

Figure 3A:
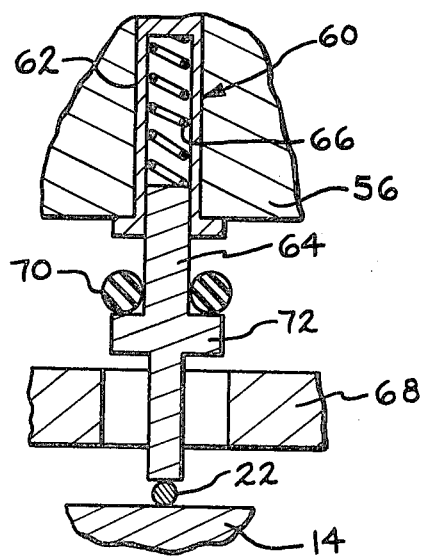

The springs 66 are of a strength to maintain the plunger parts 64 in engagement with the electrodes 22 as shown in FIG. 3A and to hold the electrodes 22 against the carriage 14. However, the force of each part 64 on its electrode is light enough to allow the electrode 22 to slide horizontally toward the work 16. The head 56 is in the FIG. 3A position during refeed. However, following completion of refeed, the head member 56 is moved downwardly by the motor 58 from the position shown in FIG. 3A to the position shown in FIG. 3 in which the head member 56 overrides the springs 66 and acts directly on the plunger parts 64. Compressible O-rings 70 on the parts 64 transmit force from the head member 56 to flanges 72 on the parts 64. The O-rings 70 tend to equalize the clamping forces applied to the electrodes by the plunger units 60 and to limit the total force applied to an electrode to that necessary to clamp the electrode against the carriage.

In the operation of the apparatus 10, assume that the components of the apparatus are in the positions illustrated in FIG. 1, that a machining cycle has just been completed, and that the next step is to refeed the electrodes 22 into engagement with the work 16. The drive motor 36 for the electrode drive roller assembly 26 is actuated so that the drive rollers 28 and 32 are rotated to move the electrodes 22 toward the work 16. During such operation of the drive motor 36, the head 56 is in the position shown in FIG. 3A so that the clamping units 60 are exerting light clamping pressure on the electrodes 22 so as not to interfere with horizontal sliding movement of the electrodes 22 on the carriage 14.

Figure 9:
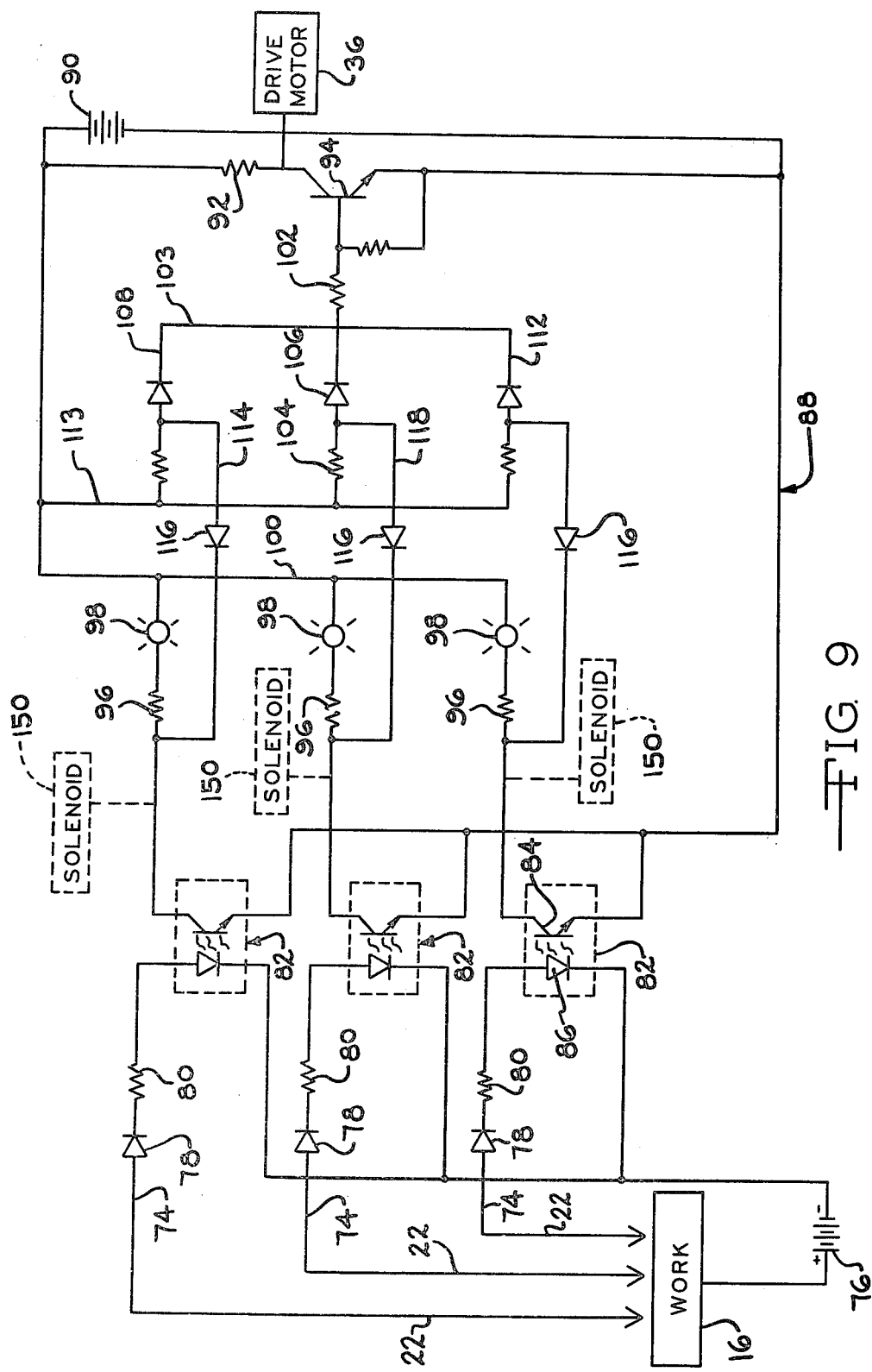
FIG. 9 is a circuit diagram showing a portion of the electrical circuitry in the apparatus of this invention for sensing electrode position, showing only three electrodes for purposes of simplicity.

Electrical leads 74, only one of which is shown in FIG. 1, connect the clamping units 60 to a power source 76 (FIG. 9) so that current is supplied to the electrodes 22 during refeed. As shown in FIG. 9, in which only three electrodes are shown for purposes of clarity, since it would only be repetitious to illustrate more, each electrode 22 is connected through a diode 78 and a resistor 80 to a light actuated relay 82 which includes a switching transistor 84 and a light emitting diode 86. The switching transistors 84 are connected in a sensing circuit 88 which includes a power supply 90 connected to the drive motor 36, a resistor 92 and a switching transistor 94 which, as will more clearly appear hereinafter, performs an AND function in the circuit 88. Each of the switching transistors 84 is connected through a resistor 96, an indicator light 98, and a lead 100 to the power source 90. The base of the transistor 94 is connected to the power supply 90 through a resistor 102 and a sub-circuit 103. The circuit 103 includes three parallel connected leads 108, 110, and 112, each of which is connected to a resistor 104 and a diode 106. A lead 113 connects the circuit 103 to the power source 90. The leads 108, 110 and 112 are each connected to one of the relays 82 by lines 114, 118 and 120 respectively so that each of the leads 108, 110 and 112 has a corresponding relay. Each of the lines 114, 118 and 120 includes a diode 116 which limits current flow to the direction indicated.

When the relays 82 are open, current is supplied to the base of the transistor 94 through all of the lines 108, 110 and 112 and this current keeps the transistor 94 on so as to keep the drive motor 36 on. However, in the event the relay 82 corresponding to the line 108 is closed, the current is diverted from the line 108 through the bypass line 114 and through the relay 82 so that current flow bypasses transistor 94. Similarly, bypass lines 118 and 120 are provided for diverting current from the lines 110 and 112 when the other two relays 82 are closed. Thus, when all of the relays 82 are closed, all of the current from source 90 is diverted away from transistor 94 thereby causing transistor 94 to turn off.

As a result, during refeed of the electrodes 22, when an electrode has been moved into engagement with the work 16, a circuit is completed through the light emitting diode 86 corresponding to the electrode 22, the diode turns on the transistor 94 and the relay 82 is closed. This condition is indicated by the corresponding light 98. The drive wheels 28 and 32 continue to rotate, since the drive motor 36 remains on until all electrodes 22 have engaged the work 16. Consequently, the rollers 28 and 32 simply slip on the electrodes 22 that have engaged the work 16 and are thus prevented from further movement. As each successive electrode 22 engages the work 16, the light 98 corresponding to the electrode will indicate the engagement condition and the switching transistor 94 will be closer to being turned off. However, the transistor 94 stays on until all of the electrodes 22 have engaged the work so that all of the current from source 90 is diverted from transistor 94, at which time the transistor 94 turns off, operation of the drive motor 36 is discontinued, and the rollers 28 and 32 stop rotating. While three electrodes are shown in the circuit 88, it is to be understood that any number can be used and that the transistor 94 will not turn off until all electrodes have engaged the work.

At this time, all of the electrodes 22 are in physical engagement with the work 16. The head 56 is then moved downwardly to the position shown in FIG. 3 so as to clamp the electrodes 22 with increased force against the carriage 14 so as to preclude movement of the electrodes 22 relative to the carriage 14 during machining. The motor 24 is operated to retract the carriage 14 so as to move the electrodes 22 away from the work 16 a distance known as the "anti-short distance." In the anti-short position of the electrodes 22, they are in positions such that when supplied with a machining current, a machining spark will be created between each electrode and the work which forms the holes 18 in the work as the carriage 14 is moved toward the work 16 so as to maintain an anti-short distance between the electrode and the work.

When the holes 18 have been formed, the motor 24 is operated to retract the carriage to the position shown in FIG. 1, so as to withdraw the electrodes 22 from the holes 18 in the work. The head 56 is moved to its position shown in FIG. 3A so as to relieve the pressure on the electrodes 22 and the drive motor 36 is started to commence another refeed of the electrode 22.

In the above described embodiment of the apparatus 10, the electrodes 22 are forced against the work 16 by the roller assembly 26 and are maintained in positions against the work by the moving force of the roller assembly 26 until all of the electrodes 22 have been engaged with the work 16. In some situations, the electrodes 22 cannot tolerate this continued application of force during refeed. An example of such a situation is a case in which the electrodes 22 are formed of such small diameter wire that they would be bent if they were repeatedly forced against the work 16.

In such cases, the apparatus 10 is modified to the extent illustrated in FIGS. 6 to 8. As shown in FIG. 8, the electrodes 22 are individually supported on wire guides 20a and are driven by a drive roller assembly 26a which is driven in the manner heretofore described by a drive motor 36. The drive roller assembly 26a consists of a lower roller unit 130 and a plurality of upper roller members 132 corresponding in number to the number of electrodes 22 so that each roller 132 is associated with a single electrode 22.

The roller unit 130 consists of a drive shaft 134, preferably formed of metal, and a plurality of blocks 136 of electrically insulating material. The blocks 136 are spaced apart lengthwise of the shaft 134 and correspond in number to the number of rollers 132. A roller 138, of electrically conducting material such as metal, is fixedly mounted on each of the blocks 136 in alignment with one of the rollers 132. As shown in FIG. 8, each roller 138 has a peripheral groove 140 of a depth less than the diameter of an electrode 22 so that the electrode 22 projects slightly radially outwardly of the groove 140. The corresponding roller 132, which is constructed like the roller 32 previously described, with a resilient outer surface, frictionally clamps the electrode 22 between the rollers 132 and 138.

Since the rollers 138 are electrically insulated from each other by the blocks 136, current can be conveniently supplied to the electrodes 22 by leads 142 which frictionally engage the rollers 138 on the undersides thereof as shown in FIG. 7. Each of the rollers 132 is rotatably mounted on a shaft 144 carried on one end of an arm 146 which is pivotally supported intermediate its ends on a pin 148 mounted on the carriage 14. A solenoid 150 is connected by a rod 152 to the opposite end of the arm 146 and is operable when energized to move the arm 146 downwardly to the broken line position shown in FIG. 7. Movement of the arm 146 to this position lifts the roller 132 out of engagement with the electrode 22 and discontinues the drive to that electrode 22. Thus, by virtue of the independent mounting of each of the rollers 132, the drive for each electrode 22 can be independently terminated.

In the operation of the apparatus 10 with the modifications illustrated in FIG. 6, when each electrode 22 engages the work, its corresponding solenoid 150, which is shown in broken lines in FIG. 9, is energized to discontinue the drive for that electrode because the drive roller 132 for that electrode is disengaged from the rotating roller unit 130. When all of the electrodes have been moved into engagement with the work, the switching transistor 94 is turned off and operation of the drive motor 36 is discontinued so that rotation of the roller unit 130 is terminated.

FIGS. 10–12 illustrate a modified form of the apparatus 10 wherein an alternative system is employed to compensate for the erosion of the electrodes during machining. A gage member 200 is provided that provides a reference surface for the electrodes 22 adjacent the workpiece 16. The gage member 200 is selectively movable to a fixed position between the workpiece 16 and the electrodes 22 prior to machining to establish a reference surface for the electrodes 22 adjacent the work 16. The gage member 200 has an electrode engaging surface 204 and a plurality of apertures or openings 206 formed in the surface 204 and extending through the gage member 200. The size of the openings 206 and the distances between adjacent openings 206 correspond to the size and the relative distances between the electrodes 22, taking predetermined clearance requirements into consideration. The gage member 200 can be modified, as illustrated in FIG. 12, so that a single elongated opening 208 is formed therethrough to accommodate the electrodes 22.

During machining, the gage member 200 is positioned so that its holes 206 are in horizontal alignment with the electrodes 22. The carriage 14 is moved to advance the electrodes 22 through the holes 206 toward the workpiece 16 to perform the machining operation. After the machining cycle, the carriage 14 is withdrawn to move the electrodes 22 to retracted positions spaced from the location of the workpiece 16 and the gage member 200 as is illustrated in FIG. 10. The gage member 200 is then moved transversely with respect to the path of movement of the electrodes 22 to a fixed position adjacent the workpiece 16 and between the workpiece 16 and the retracted electrodes 22 wherein the electrode engaging surface 204 is in horizontal alignment with the electrodes 22 to define the reference surface.

The refeed system then operates to replenish the eroded electrodes 22. The drive roller assembly 26 (or the drive roller assembly 26a shown in FIGS. 6-8) advances the electrodes 22 from their retracted positions toward the gage member 200 and into engagement with the reference surface. As has been previously described, the drive roller assembly is operable to slip over those electrodes 22 which have engaged the reference surface. After all of the electrodes 22 have engaged the reference surface so as to be located at reference positions relative to the workpiece 16, the operation of the drive roller assembly 26 is terminated when the circuit illustrated in FIG. 9 senses that all of the electrodes 22 have engaged the gage member 200.

After all of the electrodes 22 have been replenished, the gage member 200 is moved transversely with respect to the direction of the refeed movement of the electrodes 22 to position the openings in horizontal alignment with the replenished electrodes 22. Another machining cycle will then be initiated wherein the carriage 14 will advance the electrodes 22 through the openings 206 to machine the workpiece 16. Provision of the openings 206 in the gage member 200 substantially reduces the distances through which the gage member 200 needs to be moved in each cycle of movement.

The gage member 200 is suitably supported for movement on the frame 12 for up and down movement perpendicular to the path of movement of the electrodes 22. In the illustrated embodiment of the invention, the member 200 is mounted on the piston rod 210 in a conventional hydraulic cylinder assembly 212. It is to be understood that the cylinder assembly 212 operates as a gage member positioning apparatus 212 which can be driven by hydraulic, mechanical, electrical, or similar means. The apparatus 212 is operated to position the gage member 200 after a machining cycle at a location where the electrodes 22 will engage the electrode engaging surface 204 during refeed. When all the electrodes 22 have been refed, the apparatus 212 operates to move the gage member 200 to a position in which the openings 206 are in horizontal alignment with the electrodes 22 which are then moved toward the workpiece 16 through the openings 206.

Sensing of the contact of each electrode 22 with the gage member 200 occurs in the same manner as if the workpiece 16 was engaged by the electrodes 22 as has been described above. Equipping the apparatus 10 with the gage member 200 eliminates the need for retracting the carriage 14 after refeed to establish the anti-short distance between the electrodes 22 and the workpiece 16. In the fixed position of the gage member 200 during refeed, the reference surface 204 is spaced from the surface of the workpiece 16 a distance that is equal to or greater than the anti-short distance. Since refeed of the electrodes 22 is terminated when they engage the reference surface 204, the carriage 14 need not be retracted to establish an anti-short distance. The electrodes 22 are in their proper reference positions relative to the workpiece 16 and ready so that the machining cycle can be initiated.

From the above description, it is seen that this invention provides an improved system for replenishing the electrodes 22 after each machining cycle. After machining, the gage member 200 is quickly moved to a position in which its electrode engaging surface 204 is positioned adjacent the workpiece surface in which openings are to be formed. The electrodes 22 are thence refed to positions engaged with surface 204 and thus close to the workpiece resulting in a quick replenishment of the electrodes 22 so that a reduced machining time cycle can be achieved.

What is claimed:

1. In electrical discharge machining apparatus for forming a plurality of side-by-side holes of small diameter in a workpiece, said apparatus including a plurality of side-by-side wire electrodes, means for advancing said electrodes toward said workpiece during machining and for retracting said electrodes to positions spaced from said workpiece after machining, said electrodes being operable when maintained in positions spaced from said workpiece distances corresponding to an anti-short distance to erode material from said workpiece so as to form the desired holes therein, means for refeeding said electrodes from said retracted positions to compensate for erosion thereof during machining, and a gage member having an electrode engaging surface and being movable to a blocking position between and in general alignment with said workpiece and said retracted electrodes wherein said electrode engaging surface defines a reference surface spaced from said workpiece a distance at least as great as and substantially equal to said anti-short distance, said refeed means being operable to advance said electrodes into engagement with said reference surface in said blocking position to locate said electrodes in reference positions relative to said workpiece in which the distances between each of said electrodes and said workpiece is at least as great as and substantially equal to said anti-short distance, said refeeding means comprising drive means frictionally engageable with said electrodes and operable to apply sufficient force to said electrodes to advance the electrodes into engagement with said reference surface, said drive means being slippable on the ones of said electrodes engaged with said reference surface.

2. Apparatus according to claim 1 wherein said electrode engaging surface has aperture means formed therein extending through said gage member, and means operable to position said gage member during machining at a location in which said electrodes project through said aperture means.

* * * * *